US009749590B2

(12) United States Patent
Vandenbulcke et al.

(10) Patent No.: US 9,749,590 B2
(45) Date of Patent: Aug. 29, 2017

(54) METHOD FOR INTERACTIVE DIGITAL CINEMA SYSTEM

(75) Inventors: Nick Vandenbulcke, Moregem (BE); Maarten Krzesinski, Brussels (BE)

(73) Assignee: CINVOLVE BVBA, Antwerp (BE)

( * ) Notice: Subject to any disclaimer, the term of this patent is extended or adjusted under 35 U.S.C. 154(b) by 0 days.

(21) Appl. No.: 13/379,813

(22) PCT Filed: Jun. 15, 2010

(86) PCT No.: PCT/EP2010/058394
§ 371 (c)(1),
(2), (4) Date: Mar. 13, 2012

(87) PCT Pub. No.: WO2010/149540
PCT Pub. Date: Dec. 29, 2010

(65) Prior Publication Data
US 2012/0204203 A1    Aug. 9, 2012

(30) Foreign Application Priority Data

Jun. 22, 2009   (EP) .................................. 09163403

(51) Int. Cl.
| H04N 21/23 | (2011.01) |
| H04N 7/173 | (2011.01) |
| H04N 21/414 | (2011.01) |
| H04N 21/422 | (2011.01) |
| H04N 21/442 | (2011.01) |
| H04N 21/475 | (2011.01) |

(52) U.S. Cl.
CPC ... *H04N 7/17318* (2013.01); *H04N 21/41415* (2013.01); *H04N 21/422* (2013.01); *H04N 21/44218* (2013.01); *H04N 21/4755* (2013.01)

(58) Field of Classification Search
CPC .......... H04N 21/234; H04N 21/23418; H04N 21/23424; H04N 21/414; H04N 21/41407; H04N 21/41415; H04N 21/422; H04N 21/44218; H04N 7/17318
See application file for complete search history.

(56) References Cited

U.S. PATENT DOCUMENTS

| 5,835,715 | A | 11/1998 | Dahl |
| 7,840,991 | B2* | 11/2010 | Dusenberry et al. ......... 725/153 |
| 2002/0054078 | A1* | 5/2002 | Taniwaki ...................... 345/733 |
| 2002/0073417 | A1* | 6/2002 | Kondo et al. ................... 725/10 |
| 2006/0094409 | A1 | 5/2006 | Inselberg |

(Continued)

FOREIGN PATENT DOCUMENTS

| EP | 1775686 | 4/2007 |
| JP | S62221386 | 9/1987 |

(Continued)

OTHER PUBLICATIONS

International Search Report for PCT/EP2010/058394, Completed by the European Patent Office on Jul. 12, 2010, 2 Pages.

*Primary Examiner* — Rong Le
(74) *Attorney, Agent, or Firm* — Brooks Kushman P.C.

(57) ABSTRACT

A method and system for providing interactive cinema, by collecting digital data from members of an audience in response to content projected in a cinema, processing the data, interfacing the data using a digital content interface with a digital content server, and providing interactive content based on the data.

15 Claims, 2 Drawing Sheets

(56) References Cited

U.S. PATENT DOCUMENTS

2007/0067818 A1 3/2007 Hjelm
2007/0250901 A1* 10/2007 McIntire et al. ............. 725/146
2011/0271295 A1* 11/2011 Redmann et al. ............. 725/13

FOREIGN PATENT DOCUMENTS

| JP | 2001204004 | 7/2001 |
| JP | 2001523833 | 11/2001 |
| JP | 2002056137 | 2/2002 |
| JP | 2002074160 | 3/2002 |
| JP | 2004304792 | 10/2004 |
| JP | 2005051653 | 2/2005 |
| WO | 2005016475 | 2/2005 |
| WO | 2007065069 | 6/2007 |

* cited by examiner

METHOD FOR INTERACTIVE DIGITAL CINEMA SYSTEM

CROSS-REFERENCE TO RELATED APPLICATION

This application is the U.S. national phase of PCT Appln. No. PCT/EP2010/058394 filed Jun. 15, 2010 which claims priority to European application 09163403.0 filed Jun. 22, 2009, the disclosures of which are incorporated in their entirety by reference herein.

FIELD OF THE INVENTION

The present invention relates to the field of interactive theater systems. The present invention also relates to the field of audience response systems. The present invention specifically relates to the field of interactive digital cinema.

BACKGROUND OF THE INVENTION

Audience response systems enable an audience to participate in an interactive content through an interactive platform. Typically a presenter uses a computer and a projector to project a presentation for the audience to see. In the most common use of such audience response systems, presentation slides built with the audience response software display questions with several possible correct answers. The audience participates by selecting the answer they believe to be correct and pushing the corresponding key on their individual (wireless) keypad. Their answer is then sent to a base station—or receiver—that is also attached to the presenter's computer. The audience response software collects the results, and the aggregate data may be displayed within the presentation for all to see. Some keypads also have additional keys, allowing the presenter to ask (and audience members to answer) True/False questions or even questions calling for particular numerical answers.

Depending on the presenter's requirements, the data can either be collected anonymously (e.g., in the case of voting) or it can be traced to individual participants in circumstances where tracking is required (e.g., classroom quizzes, homework, or questions that ultimately count towards a student's course grade). Incoming data may also be stored in a database that resides on the host computer, and data reports can be created after the presentation for further analysis.

Audience response software enables the presenter to collect participant data, display graphical polling results, and export the data to be used in reporting and analysis.

In addition to the presenter's computer and projector, the typical audience response system has the following components: base station (receiver), wireless keypads (one for each participant), and audience response system software.

The majority of current audience response systems use wireless hardware. Two primary technologies exist to transmit data from the keypads to the base stations: infrared (IR) and radio frequency (RF). A few companies also offer web-based software that routes the data over the Internet (sometimes in a unified system with IR and RF equipment). Cell phone-based systems are also becoming available.

U.S. Pat. No. 5,835,715 describes an apparatus for interactively presenting information to members of an audience including a computer server means, a visual display means connected to the computer server means for displaying information to all members of an audience, an information storage means connected to the computer server means for storing information related to a plurality of categories and a plurality of topics related to each of the categories, and a plurality of seat computer means connected to the computer server means. Each seat computer means generates category selection signals and topic selection signals upon actuation by an associated member of the audience and displays the stored information to the associated audience member. This is a dedicated system comprising a computer server for both collecting and displaying information.

It is also the case that a generation of movie viewers has grown up with video game experience in which the game player actively controls video content. Members of this generation often find the movie experience too passive and would like to have the opportunity to influence what appears on the screen, or to interactively participate and share opinions.

WO 2005/016475 describes an in-theater interactive entertainment system including a game server to generate dynamic video content in digital form and a digital display in a theater for displaying the video content from the game The game server is connected to a telephony system and enables a plurality of individual game participants in the theater to exchange data wirelessly with the game server to affect on-screen video content. Software running on the game server and the telephony system enables the game participants to interact with the video content on the display. Again, a dedicated (game) server connects both the telephony system and the dynamic content.

As the pace of life continues to accelerate in the 21st century, people become restless and bored while sitting in a movie theater waiting for the previews and feature presentation to begin. Some movie theatres fill this time period with a static slide show including movie trivia questions, intermingled with commercial announcements and movie previews. The content of the latter is however fixed beforehand.

The advent of digital cinema projection systems has brought about new opportunities in the form of interactive digital cinema and alternative content such as live special events, sports, pre-show advertising and other digital or video content, such as e.g. Q&A sessions. This is a major added incentive for exhibitioners and advertisers. Currently, digital cinema technology is just beginning to take hold in the industry. Projection rooms today comprise a mix of analog and digital cinema, e.g. combining 35 mm film with digital projection. However, because of emerging trends and needs, more and more cinema complexes are introducing digital cinema.

Digital Cinema Projection (or Digital Cinema, for short) is a method whereby the traditional film containing the movie is replaced by an electronic copy contained on a storage device, such as e.g. a high-capacity hard drive and a server. A digital content server is a device that outputs digitally encoded content to a digital projector. Digital content servers are highly specialised equipment. Interoperability and compatibility between different manufacturers' digital cinema systems is a major hurdle. Standardization is still in progress at this time. In addition, interfacing with a digital content server is not available, i.e. on-screen content flow is not subject to audience input.

Much work remains before the digital cinema server is truly a commodity. Typical off-the-shelf audience response systems (or interactive theater systems) provide no connectivity or interfacing with digital cinema (content) servers or other external applications.

SUMMARY OF THE INVENTION

It is an object of the present invention to provide connectivity between audience response systems and digital content servers or other digital cinema applications. It is further an object of the present invention to interface a system for collecting data from an audience with a digital content server for use in an interactive content session. It is yet a further object to provide an audience data management system with open access to digital content servers for digital cinema, for interactively changing content from said digital content server directed by the input of said audience data management system.

The present invention relates to a data management system for interactive digital cinema, comprising input means for collecting digital data from members of an audience and processing means for processing the data. The data management system further comprises a digital content interface for interfacing the processed data with a digital content server as commonly used in digital cinema for providing content to the audience.

In a specific embodiment the audience input data is used by the digital content server to provide interactive content to said audience, whereby the content is selected based on the processed data.

In another embodiment the audience responds to the content provided by the digital content server.

In one embodiment the digital content interface is configured to send processed data to a digital content server. In another embodiment the digital content interface sends alternative content to a digital content server, selected based on said processed data. In yet another embodiment the digital content interface is configured to receive content requests from said digital content server.

In a specific embodiment the processing means comprises computer processing means for performing calculations and other computer instructions on said data. The digital content interface is connected to the digital content server through a network, wireless or not.

In a preferred embodiment the data management system further comprises data storage means for storing said collected or processed data, or any alternative content.

In one embodiment the digital content interface may be configured to communicate the data or content through a network or via web-based technology such as e.g. intranet and other webservices.

In a specific embodiment the data management system further comprises a seat occupancy detection system.

The digital content server typically provides any content including advertising, movies and gaming.

In a second aspect the present invention relates to a method for providing interactive cinema, comprising the steps of collecting digital data from members of an audience in response to content projected in a cinema, processing said data, interfacing said data by means of a digital content interface with a digital content server, providing interactive content based on said data. Said interactive content is stored on said digital content server or provided by said digital content interface.

In a specific embodiment there is provided a data management system for collecting responses from a theater audience to interactive cinema, said interactive cinema being managed by a content server, said responses being inputted on keypads applied at the theater seats, and a central server connected to said keypads for processing said inputs into a format suitable for use by said content server.

In another specific embodiment there is provided a data management system wherein said input means is applied at each seat, either retro-fitted or integrated. The input means is a button keypad connected to said processing means through a network.

In a specific embodiment said network is wireless having a self-routing, self-healing meshing topology scalable up to over 1000 nodes.

The data management system of the present invention may be used for marketing or entertainment purposes, such as e.g. surveys, corporate events, advertisements, interactive learning events, Q&A sessions, voting sessions, business meetings, seminars, multi-media presentations, training, and conferences.

The advantages of the present invention are numerous. A wide variety of non-feature film content can be shown, increasing occupancy in off peak times, leading to increased revenues. This content can be related to sports (e.g. Football World Cup, tennis competition), music (e.g. live and pre-recorded concerts, operas, DVD launches), gaming (e.g. multi-players competitions, game sessions), TV specials (e.g. quiz, polling), corporate events (e.g.: product presentations, seminars), and education (e.g. interactive learning, training, surgery broadcast).

Other advantages are in the advertising sector whereby e.g. more adverts can be stored on a server and easily selected and played; advertising can be targeted to a particular audience (with connection to the ticketing and PoS machines); different ad reels can be played at different times of day; time sensitive advertising can easily be programmed. Digital advertising can be interleaved with trailers and cinema ads (i.e. for food & beverage).

Exhibitors know more about their customers who can express their opinion in realtime by answering various questions and varying the content in this way. This sets the way to first hand marketing information for any company using the cinema as medium, extra entertainment for customers, scheduling information (e.g. which films to show), alternative use of cinema theater. The system of the present invention allows for interactive advertisement from external sources (e.g. food and beverage provider) as well as from internal sources (e.g. special promotions).

DETAILED DESCRIPTION OF THE INVENTION

Figure 1:
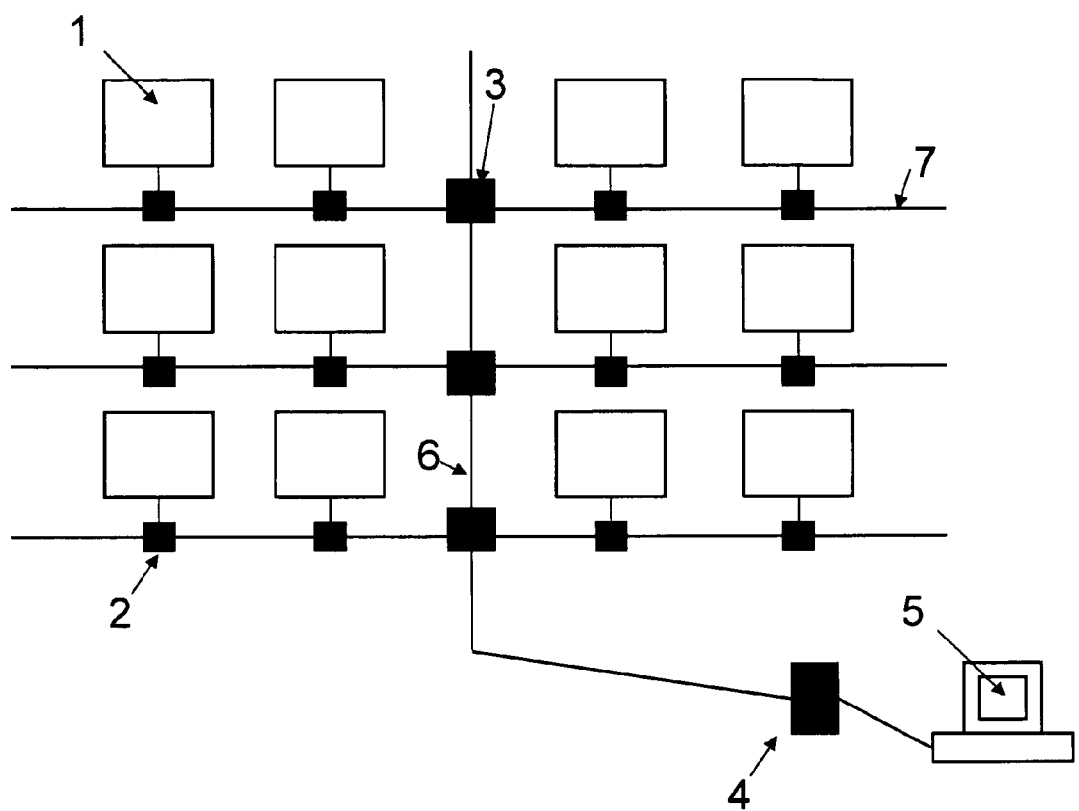
FIG. 1 represents a block scheme of an input means applied at each seat.

The present invention discloses a data management system for interactive digital cinema, comprising input means for collecting data from members of an audience and processing means for processing said data characterized in that said data management system further comprises a digital content interface for interfacing said processed data with a digital content server providing interactive content to said audience. Said content is selected based on said processed data and said audience may respond to said content. Said data from members of the audience may be analog or digital data and is typically digitised for further interfacing with a digital content server.

Digital cinema refers to the use of digital technology to distribute and project motion pictures and other digital data. A movie can be distributed via hard drives, optical disks or satellite and projected using a digital projector instead of a conventional film projector. The content used for digital cinema may have originated on film or have been electronically captured. Other digital data can include policy trailers, commercials, local advertising, live pay per view events, learning and business events and video gaming. To maximize theater revenues, digital projection is open to any digital content. A digital cinema system typically includes a server, a projector, a sound processor and an automation interface.

A digital cinema server (or digital content server or digital cinema operating system) provides the means to store and play digital content. A digital content server performs several functions including storage and replay of the digital movie data, security decryption, and image decoding. Advanced systems may also provide a control panel for the projectionist, scheduling features and comprehensive automation interfacing. There are yet no standards in digital cinema, only specifications for digital projection agreed to by the DCI. DCI (Digital Cinema Initiatives) provides a common set of content requirements to assure interoperability and compatibility among multiple equipment vendors and service providers. Conformance to DCI's specifications is considered a requirement by software developers or equipment manufacturers targeting the digital cinema market. Contrary to digital content servers, advertising servers may not be DCI compliant.

Servers referred to in the present invention generally employ arrays of hard disks to store the content. High-quality content requires a lot of disk space, even when compressed, so server storage capacities will typically be several hundreds of Gigabytes (thousands of megabytes) or a number of Terabytes (millions of megabytes).

Said servers usually provide a number of ways in which content can be loaded into storage. Digital tape cartridges are frequently used to transport content but optical disks (DVD-R) and removable hard drives are also often supported. In addition it is common for servers to have Ethernet ports to allow content to be transported by various types of network.

Said servers usually offer high levels of security to prevent unauthorized copying or playback of restricted content. In some cases the content will only play on a server if a time-sensitive, site-specific key value is provided.

Examples of server suppliers are XDC and GDC Technology, offering solutions for digital post-production, delivery and exhibitions of movies, onscreen advertisement and alternative content.

As of today, content servers are typically provided either for film or for advertising purposes. Film content servers provide the full range of security, whereas advertising servers would need less security. Other content servers may provide for both film and advertising purposes.

Content may also be ingested from a central storage or server system and delivered to individual servers.

The term "interactive theater system" and similarly "interactive cinema" refers to the participation of the audience in some or all aspects of a theater system or cinema, e.g. giving the audience an active role in the showing of movies, or other content, whereby the audience not only receives information but also sends back audience input information. The theater system or cinema can use this audience input information for different purposes, realtime or delayed. The audience input information may just be stored for later use, or action may be taken to change the cinematic content accordingly.

The data management system of the present invention is interfaced with a digital content server. The audience can interact with the content provided by the digital content server by means of an audience response system as previously described. Depending on the way the audience interacts, said content is adapted accordingly. As such, the digital content server provides interactive content in response to the audience's preference.

An audience response system may be part of a Theater Management System (TMS) that manages content storage, keeps operational logs of what has been played or what will need to be played, movement of content to the auditorium and can interface with ticketing, contract management and keymanagement. The TMS is the system that may be installed in a multiplex to control the central storage, monitor the different screens, communicate with the external world, edit shows and schedules.

The term "content" is widely used to refer to a specific piece of material consisting of visual images and/or sound or to a collection of such pieces. Content may be e.g. a movie, an advertisement, a game, a rock concert, a business seminar, a learning session, a show or a quiz.

The term "interactive content" is content that is adapted in realtime by interaction of an audience or any other external source. Interactive cinema gives the audience an active role in the showing of movies and other digital data.

The term "alternative content" is to be understood as entertainment programming other than movies that can be played in a digital cinema environment. Possibilities include sports and other live events. Alternative sources are usually connected via the second input of a digital cinema projector and a suitable cinema audio adapter. In the remainder of the description, the term content is to be understood as comprising interactive and alternative content.

Content for digital cinema is stored and distributed in very high quality digital form. Appropriate levels of security are in place for each situation where the content is stored or transported. Content may be encrypted so it can only be loaded and played on servers when a security key is present. The key—either physical or in the form of software—can be set to be valid for limited periods of time. The encryption may also encompass the link between server and projector to prevent electronic copying of the content during playback. Interactive content may also be subjected to security levels.

Content is delivered in many, increasingly, different forms—in terms of the both the physical medium and the way in which the images and sound are encoded. The form in which it is available may not always be ideal for the intended use and a format conversion step may be necessary.

In the world of digital cinema, distribution refers to the way in which content in a digital form is delivered to the point at which it is to be presented to an audience. There is no ideal method for all circumstances and the best solution for a particular application is one that meets the economic, security and time goals.

Small-scale distribution is often best achieved through the use of physical media—such as high-capacity data tapes. At the receiving end, the content is loaded from the tapes onto a server for eventual playback. The tapes can be encrypted to reduce the risk of unauthorised use and are small enough to be carried by normal or secure postal services. The cost of a tape is very small compared with that of a film print. Where there are many sites that need access to the content, distribution by satellite broadcast may be the best option. A high level of encryption would be employed to ensure that the content was only of use to the intended recipients. The content could be presented, live, as it is being received or stored on a server for later showing. The cost of the satellite bandwidth necessary to transmit Gigabytes of data may be high but when shared over a large number of receiving sites, it makes economic sense. Sites in major cities may be able to employ fibre-optic links for fast—even real-time—transfer of digital content. Networks of "dark-fibres" have been laid between many cities and a connection point at or near a site may already exist. This type of link is point-to-point so unauthorised reception is less likely but some level of encryption would still be advisable. The cost of this approach varies according to the bandwidth of the link and the amount of time it is required. It is most suited for time-critical applications.

It is probable that a practical distribution strategy will employ a combination of techniques and will evolve to accommodate the number of recipients whilst exploiting advances in digital connectivity.

There are many forms and degrees of automation in cinemas. Simple automation systems may just need a connection to the lighting system to bring up the lights when the show finishes. Full automation may have the entire performance scheduled and controlled by a computer. Digital cinema systems can be fully integrated into existing automation schemes through good system design. Digital cinema servers generally have their own event-driven automation which may connect directly to an existing film-based system. Data management systems according to the invention may interact with any of these automation systems controlled by the server.

In a preferred embodiment said content is provided on a cinema screen. In another embodiment said content can be provided on individual screens applied at each audience seat. In yet another embodiment said content is provided on any screen or imaging means within a cinema complex, e.g. the foyer.

In a preferred embodiment the audience is a single theater room audience. In another embodiment the audience is spread over multiple theater rooms of a cinema complex. In yet another embodiment the audience is spread over multiple cinema complexes. In a further embodiment the audience could also be a web-audience, following a digital interactive projection online.

The data management system of the present invention differs from prior art audience response systems or interactive theater systems in that the digital content server is not part of the data management system and may be any digital content server. As such, audience input and processing is separated from content and projection as such, yet on-screen content flow is subject to audience input by means of an interface.

Figure 2:
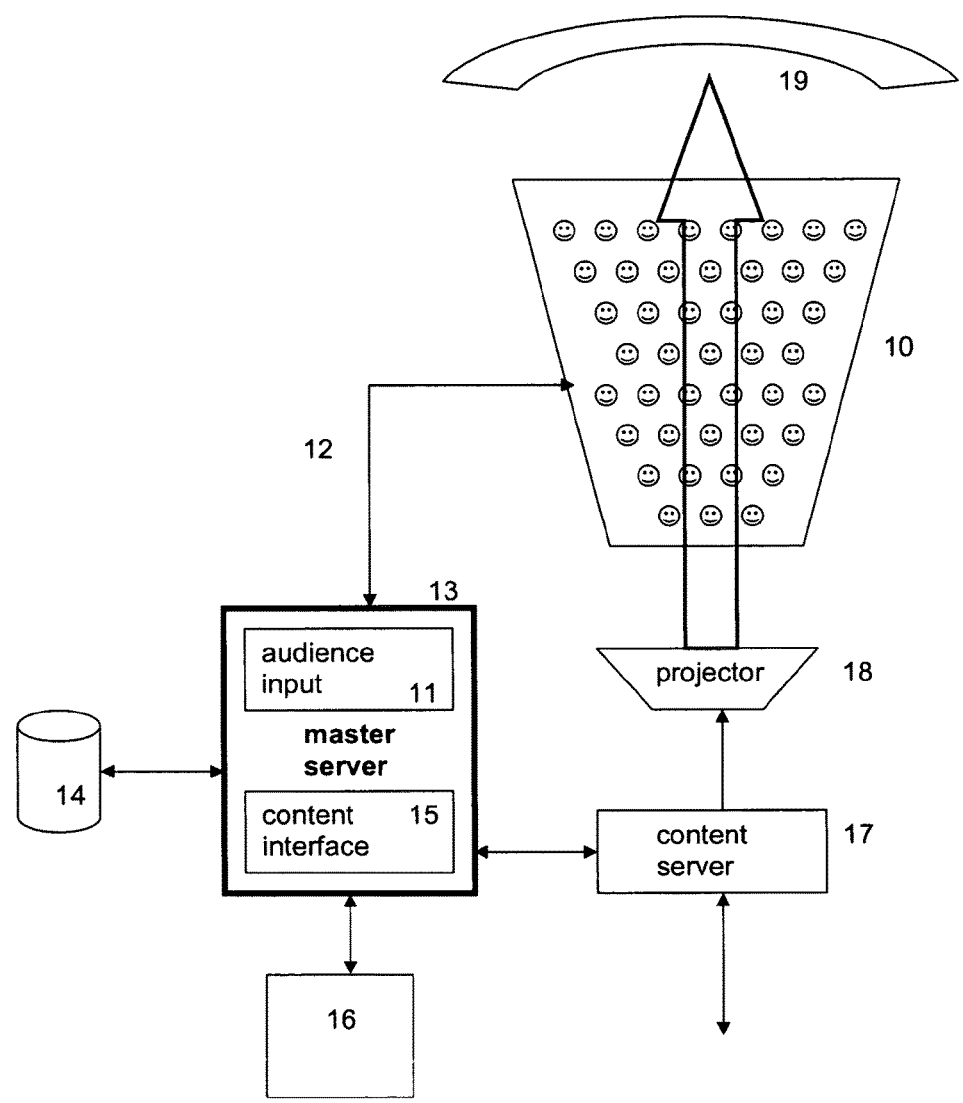
FIG. 2 illustrates a data management system according to the invention.

FIG. 2 illustrates a data management system according to the invention, comprising audience input (10) connected via a network (12) to a master server (13). The master server (13) comprises processing means for processing the audience input data (11) and optionally storage means (14). A digital content server (17) controls a digital projector (18) for projecting content on to a screen (19). The master server (13) further comprises a digital content interface (15) for interfacing audience input (11) with the digital content server (17) for use in interactive digital cinema. External applications (16) may be linked to the master server.

Any connecting or interfacing may be provided by internet or VPN, or any communication network available.

To enable the audience of a movie theater to participate in interactive (cinematic) content through an interactive platform, multiple button control units are retro-fitted to each seat of the theater. In one embodiment the button control units are connected to the seat modules of an occupation monitoring system as described in EP 1,775,686 by Applicants. In another embodiment the button control units are integrated in e.g. the seat armature, where they can be installed during manufacturing of the seats. A button control unit may comprise two buttons (yes/no). In another embodiment the button control unit has more buttons. The buttons may be coloured differently. The button surfaces may be different in shape and/or texture in order to differentiate the buttons in the dark and to press them on feeling.

In one embodiment the button control units are keypads with physical buttons. In another embodiment the button control units are touch sensors or pressure sensors, capacitative or resistive. The buttons may also be integrated in a touchscreen. Button control units may also be wireless, handheld devices or even cell phones.

In yet another embodiment a seat unit has input means on both armrests. This could be favourable for gaming purposes. Other input means could include a joystick, scroller, or any other known input means. In yet another embodiment, full keyboards could be provided for members of an audience, either applied to seats or to desks.

In a further embodiment, input means could include 3D virtual input means, such as e.g. cyber-gloves that follow the movement of the hands. In a further embodiment input means include cameras and IR sensors.

Within the scope of the invention, input means can comprise all known and future means for inputting a response from one or more members of the audience.

The seat units are connected within a network. This may be wireless or not, as set out in the examples. In one embodiment there is provided one network per theater auditorium. In another embodiment there is provided one network over a plurality of theater auditoria within one theater complex. In yet another embodiment, there is provided a network over a plurality of theater auditoria within multiple theater complexes for conducting interactive events with theater audiences throughout the theater network.

Input from the seat units is collected and processed by a master server. In one embodiment external applications can connect to the master server to access the input data for further processing—for example, a Digital Content Server connects to the master server and alters content flow according to audience input. Or an advertising company can collect audience input from the master server collected from an advertising session. In another embodiment the master server can connect to a digital content server and provide audience input for use in altering content provided by the digital content server. In yet another embodiment the master server can connect to a digital content server and provide the digital content server with alternative content depending on the audience input. Said alternative content may be stored in the master server or may be retrieved from external sources.

The master server may comprise storage means for storing audience data or intermediate processed data before sending to the digital content server.

In yet another embodiment the master server sends information back to the audience by means of the seat units.

The master server comprises processing means for processing the audience input data in various ways, e.g. averaging, format changing, statistics, graphs, decision process. Said processing may be performed by appropriate software.

The processed audience input data may also be sent to a show server, a printer, text, a database (SQL), a web service (internet XML), an sms, or any other digital data server.

The data management system of the present invention finds use in many purposes, including marketing or entertainment purposes, such as e.g. surveys, corporate events, advertisements, interactive learning events, Q&A sessions, voting sessions, business meetings, seminars, multi-media presentations, training, gaming and conferences.

The invention will now be further explained by the following examples.

Example 1: Audience Input Means with Wired Network Button Control Units

As shown in FIG. 1 each seat (1) has a seat module (2). Each seat module has a button control unit. The various seat modules are connected with each other via a one-wire bus (7). This bus is used for both data transfer and power supply.

The plurality of seats are advantageously divided in a number of groups, e.g. of 20 units. Each group is connected to a junction module (3) being connected to the same one-wire bus connecting the seat modules belonging to that group. The junction modules can read out the information from the corresponding set of seat modules.

The junction modules are capable of communicating with a processing device (5) for processing the button data. The processing device (master server) is typically a personal computer. The individual junction modules are connected with each other and with the processing device by means of an asynchronous serial bus comprising four wires, two of which supply power while the other two are meant for data transfer. Data communication over this serial bus can for example be based on the RS-485 protocol. Optionally a converter (4) can be provided for converting the asynchronous serial bus into a USB or RS232 port to ease the communication with the processing device (5).

Moving a part of the system's complexity from the level of the seat modules to that of the junction modules allows speeding up significantly the data collection process. This feature makes the system also very suitable for monitoring a large number of items. The monitoring system according to the invention is capable to detect the button control units of hundreds of seats in a matter of seconds. In the case of a wired implementation of the system a further advantage is that the number of wires can be limited drastically. Between the seat modules only three wires are required and between the various junction modules four wires are sufficient.

The various parts of the system are discussed more in detail in the subsequent paragraphs.

The seat module (2) may comprise a small micro-controller for interpreting the information from the corresponding button control unit and for communication with the one-wire bus. The micro-controller comprises flash memory for optional software, as well as some EEPROM for storing information (e.g. the seat identification). Further connection is provided for the one-wire bus and for a supply bus.

Each junction module is arranged for communication with the processing device over the asynchronous serial bus as well as for communication with the seat modules over the one-wire bus. The junction module can be positioned anywhere on the one-wire bus. The junction module continuously monitors the button control unit of the seat modules connected to the same one-wire bus. On request of the processing device it transmits the status of the seat modules connected. A table comprising a list of seats (seat modules) connected to the junction module and their status is kept. The necessary connectors are provided. A junction module further comprises a micro-controller and memory means (e.g. of the flash-EPROM type) to render the module programmable.

For data communication over the asynchronous serial bus the already mentioned RS-485 protocol is particularly suitable, as it uses differential signals (it compares the voltage difference over the two wires). Due to the reduced noise levels higher bit rates and much longer communication distances can be achieved and more robustness is provided. It further allows using a bus with several transmitters and receivers.

The logical protocol is designed to optimise the efficiency of the data transport and to reduce as much as possible the required micro-controller software. The first three bytes of any data packet sent always have the same meaning: the first byte identifies the sender of the message (i.e. either the processing device or a junction module), the second byte contains the identification of the destination and the third byte comprises some control bits: an indication of the data packet size, indication of an 'acknowledge' message, . . . . The last byte of the data packet is a cyclic redundancy check (CRC) sum.

As there is only one bus, the communication between the junction modules and the processing device is in half duplex mode. Messages sent over the bus are to be acknowledged to the transmitter by sending either an acknowledge message or a reply comprising a new message. When the transmitter does not receive any message back from the destination address, an error has occurred. The original message then needs to be sent again.

The processing device, typically a personal computer, is the master in the communication over the serial bus. The junction modules only communicate in reply to a message previously sent by the controller. When, for example, the controller has sent a message asking information on the status of a certain seat or number of seats, the junction module replies by sending the desired status information. The processing device keeps a table comprising the status of all items to be monitored. The table is continuously updated while new status information of a seat is received. Each junction module on the asynchronous serial bus must clearly have a unique address in order to be addressable by the processing device.

An example of a message from processing device to junction module is given. The processing device can send an 'acknowledge' after having received a message from a junction module. The controller may also send a standard message to provoke a reply from a junction module. In the latter case a typical message from the controller to a given junction module can look like this (byte-per-byte): whereby the first three bytes and the last one have a meaning as already explained before and comm1 and comm2 comprise a message requesting the status of the seat modules.

A further explanation on the operation of the occupation monitoring system is now provided. Suppose the seats in the theatre are divided in subgroups on a row-per-row basis and the seat modules of all seats of a same row are connected to one junction module. This junction module is the master for the communication over the one-wire bus connecting all seat modules of the row in question.

In one operational mode, each junction module constantly interrogates its slaves (i.e. the seat modules). The information from all seats is stored in the memory provided in the corresponding junction module. The junction module is capable of scanning the one-wire bus two to three times per second, so the stored information is updated at the same rate. In another operational mode, the seat module sends information to the junction module as soon as an input has been made. This information may also be sent directly to the master server.

At the installation of the system (or at start-up) a learning procedure must be carried out in order to assign a unique sequence number to each item of the group of items to be monitored. This is performed for each junction module in turn in the following way. The junction module sends a signal to the seat modules connected with it to indicate the learning mode is entered. All seat modules set their sequence number to 0. Then numbers are assigned from 1 to N by consecutively occupying each seat to be numbered. By occupying the seat the next number to be attributed goes to that seat.

During the set-up procedure as described the monitoring system may advantageously also employ an (optional) console. The console can be considered as an extension of the junction modules without any intelligence of its own. It only allows a more practical way of operating the junction modules and of getting feedback from the junction modules. It can e.g. display which number is assigned during the learning procedure. The console takes over some of the functionalities provided by the junction modules. Alternatively the initialisation procedure can also be performed by using a personal computer device.

The console may also be useful for test purposes. In such a test one can for example request the sequence number of a certain item to be monitored. The junction module connected to the same one-wire bus is then switched into a test mode. The console then takes over some of the functionality of the console. In other words, a check on the item sequence numbers can already be performed during the installation of the system, when the processing device still has to be installed.

Example 2: Audience Input Means with Wireless Button Control Units

In an alternative embodiment, the seat button control units are wireless low powered battery units joined in an individual wireless network per theater auditorium with a self-routing, self-healing meshing topology supporting large scale sizes of over 1000 nodes without significant performance penalty. The units are preferably in sleep mode conserving power until a wake-up signal is received.

Example 3: Data Management System for Interactive Cinema

In one embodiment the data management system of the invention may operate as follows. Audience input may be collected in a cinema auditorium as set out in Example 1 or 2. Said audience input is digital data inputted on a button keypad that can be processed by a master server computer linked to the audience input system. The keypad comprises e.g. two buttons representing a yes/no option.

During pre-view time, the exhibitor wants to ask some questions to the audience e.g. about the preference of movies to be scheduled in the future. The audience can answer accordingly. This information is stored in the master server and will be used later as statistics. The master server comprises software for performing the necessary processing on the audience input data.

A digital content interface, provided in the master server, interfaces the audience input data with a digital content server controlling the digital projector within said theater auditorium. Interfacing depends on the manufacturers specifications. The digital content server may alter the content of image and sound based on the audience input information, e.g. the sound could be lowered, the sound could be changed from male to female voice, another line of story could be followed, or a response from the audience could be requested. For this purpose, the digital content server provides the necessary software or options for chosing these alternatives.

As such, the audience will interact with and respond to the content shown in the cinema.

When connecting a seat occupancy system to the data management system, the content could interact with the audience in yet more specific ways, taking account of the seats that are taken.

The invention claimed is:

1. A data management system for providing connectivity between an audience response system and a digital content server, said digital content server used for managing an interactive digital cinema and controlling a digital projector for projecting content on to a screen, said data management system comprising:
    input means for collecting digital data from members of an audience, said digital data being in response to content projected in a cinema, said input means connected via a network to a master server, said master server comprising
    (i) processing means for processing said digital data and delivering processed data, and
    (ii) a digital content interface for interfacing said processed data with said digital content server providing interactive content to said audience, wherein said digital content interface selects, based on said processed data, alternative content from external sources, reformats said alternative content to a format used by said digital content server, sends reformatted alternative content to said digital content server for display on said screen, and is configured to receive interactive content requests from said digital content server.

2. The data management system of claim 1 wherein said audience responds to said interactive content.

3. The data management system of claim 1 wherein said processing means comprises computer processing means for performing calculations and other computer instructions on said data.

4. The data management system of claim 1 wherein said digital content interface is connected to said digital content server through said network.

5. The data management system of claim 1 wherein said network is wireless.

6. The data management system of claim 1 further comprising data storage means for storing said collected or processed data.

7. The data management system of claim 1 wherein said digital content interface is configured to communicate said data to the internet.

8. The data management system of claim 1 wherein said digital content server provides any content including advertising, movies and gaming.

9. The data management system of claim 1 further comprising a seat occupancy detection system.

10. The data management system of claim 1 wherein the interactive session is a showing of a movie.

11. The data management system of claim 1 wherein the alternative content includes live events.

12. A method for providing connectivity between an audience response system and a digital content server, said digital content server used for managing an interactive digital cinema and controlling a digital projector for projecting content on to a screen, said method comprising the steps of:
    collecting, by a master server, digital data from members of an audience in response to content projected in a cinema from the audience response system;
    processing, by the master server, said digital data and delivering processed data;

interfacing said processed data by means of a digital content interface in the master server with said digital content server;

receiving, by the digital content interface, interactive content requests from said digital content server;

providing, by the digital content interface, interactive content based on said processed data and interactive content requests;

selecting, by the digital content interface, alternative content from external sources based on said processed data;

reformatting, by the digital content interface, said alternative content to a format used by the digital content server; and providing, by the digital content interface, reformatted alternative content to the digital content server.

13. The method of claim 12 wherein said interactive content is stored on said digital content server or provided by said digital content interface.

14. A theater data management system for interfacing a digital content server that is configured to control a digital projector that projects content onto a cinema screen during a performance for viewing by an audience in a cinema to an audience response system that is configured to collect digital data from members of the audience during the performance in response to content projected onto the cinema screen, the system comprising:

a master server in communication with the audience response system and the digital content server, configured to (i) receive interactive content requests from the digital content server, (ii) receive the digital data from members of the audience from the audience response system, (iii) process the digital data and send processed digital data to the digital content server, (iv) select alternative content from external sources based on the processed digital data and the interactive content requests, (v) reformat the alternative content to a format used by the digital content server, and (vi) send the reformatted alternative content to the digital content server for display on the cinema screen to provide interactive content to the audience during the performance.

15. The theater data management system of claim 14 wherein the master server is further configured to encrypt the alternative content and send encrypted alternative content to the digital content server.

* * * * *